R. J. ALTGELT.
ATTACHMENT FOR PLANTERS.
APPLICATION FILED JUNE 2, 1913.
1,084,307.
Patented Jan. 13, 1914.
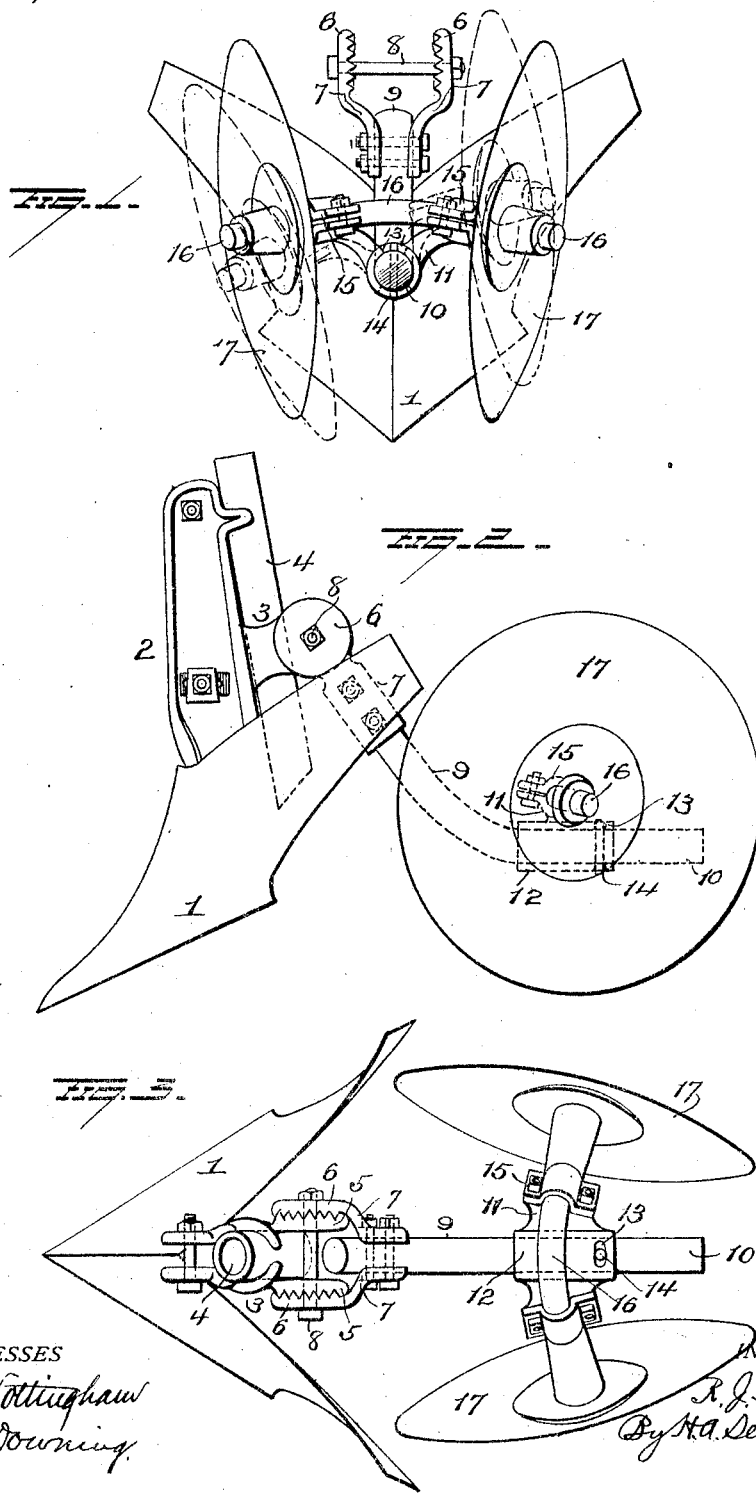
WITNESSES
INVENTOR
R. J. Altgelt
By H. A. Seymour
Attorney

UNITED STATES PATENT OFFICE.

RUDOLPH J. ALTGELT, OF SOUTH BEND, INDIANA, ASSIGNOR TO OLIVER CHILLED PLOW WORKS, OF SOUTH BEND, INDIANA.

ATTACHMENT FOR PLANTERS.

1,084,307.  Specification of Letters Patent.  Patented Jan. 13, 1914.

Application filed June 2, 1913. Serial No. 771,298.

*To all whom it may concern:*

Be it known that I, RUDOLPH J. ALTGELT, of South Bend, in the county of St. Joseph and State of Indiana, have invented certain new and useful Improvements in Attachments for Planters; and I do hereby declare the following to be a full, clear, and exact description of the invention, such as will enable others skilled in the art to which it appertains to make and use the same.

This invention relates to improvements in attachments for planters and more particularly to improved means for mounting covering disks in rear of the furrow-opening member,—the object of my present invention being to so mount the supporting means for the covering disks that when one of the disks engages an obstruction, it will rise and ride over the same without causing the lifting of the entire machine.

A further object is to so mount the covering disk axle that the same will have a swiveled support, whereby the two disks will be balanced against each other and the pressure on them from below will be the same on one as on the other under normal conditions.

With these and other objects in view, the invention consists in certain novel features of construction and combination of parts as hereinafter set forth and pointed out in the claims.

In the accompanying drawings, Figure 1 is a rear elevation, showing my improvements; Fig. 2 is a side elevation, and Fig. 3 is a plan view.

1 represents a furrow opener or plow bottom which may be of the double mold-board type and provided with a suitable standard or supporting means 2. Arms 3 are secured to the standard and embrace a seed tube 4. The rear ends of the arms 3 are provided with circular enlargements 5, having toothed outer faces to mesh with the toothed inner faces of enlargements 6 at the upper forward ends of arms 7. A bolt 8 passes through the disks 5 and 6 so as to hold the same locked together and retain the devices connected with the arms 7 at any desired vertical adjustment, as will be hereinafter made apparent. The arms 7 embrace one end of a bar 9, which is bent to form an obtuse angle and projects downwardly and rearwardly from its connection with the plow standard. The rear, normally horizontal portion 10 of bar 9 carries a bracket 11, the central portion of which forms a sleeve 12 which is loosely mounted on said bar so as to be capable of rocking thereon. Near one end, the sleeve 12 is provided with a transverse elongated slot 13, into which a pin 14 on the portion 10 of bar 9 enters, to limit the rocking movement on the bracket and to prevent displacement of the latter longitudinally of the bar.

As shown in Figs. 1 and 3, the bracket 11 is disposed transversely of the bar 9—10 and is provided with bearings 15 for a bent axle 16 on which covering disks 17 are mounted. The axle 16 is so bent or curved as to place the disks closer together below and behind rather than above and in front, in order to cause them to properly scrape the earth over the seed.

It is apparent that the covering disks may be adjusted vertically by means of the adjustable connecting means hereinbefore described, between the bar 9—10 and the plow standard. By swiveling bracket 10 to the bar 9—10, said bracket will be permitted to rock freely, so that when any obstruction, such as a clod or stone, gets under one of the disks, this disk will be permitted to rise and run over such obstruction without lifting the entire machine, the other disk being pressed deeper into the ground. With the use of my improvements, the two disks are balanced against each other and the pressure from below, on them is always equal under normal conditions.

Having fully described my invention what I claim as new and desire to secure by Letters-Patent, is:—

1. An attachment for planters, comprising a bar having an approximately horizontal portion, a bracket mounted to a rock on said approximately horizontal portion of the bar, an axle secured to said bracket transversely of the bar, and disks mounted on said axle.

2. An attachment for planters, comprising a bar having an approximately horizontal portion, means for adjustably connecting the forward portion of the same with the planter in rear of the mounting of the furrow opening member thereof, a bracket mounted to rock on the approximately horizontal portion of said bar, an axle secured to said bracket transversely of the bar, and covering disks mounted on said axle.

3. An attachment for planters, comprising a bar adapted for attachment to the planter in rear of the mounting of the furrow opening member thereof and having an approximately horizontal rear portion, a rocking bracket loosely mounted on the approximately horizontal rear portion of said bar, means for limiting the rocking movement of said bracket, covering disks disposed at an angle to each other, and mountings on said bracket for supporting the disks at respective sides of said bar.

In testimony whereof, I have signed this specification in the presence of two subscribing witnesses.

RUDOLPH J. ALTGELT.

Witnesses:
EDWIN NICAR,
KATE E. BUCKLEY.

---

Copies of this patent may be obtained for five cents each, by addressing the "Commissioner of Patents, Washington, D. C."